United States Patent Office 3,152,144
Patented Oct. 6, 1964

3,152,144
HYDROGENATION OF SULFOLENES TO SULFOLANES
John T. Middlebrook, Borger, Tex., assignor to Phillips Petroleum Company, a corporation of Delaware
No Drawing. Filed July 11, 1961, Ser. No. 123,129
3 Claims. (Cl. 260—332.1)

This invention relates to an improved process for the catalytic hydrogenation of sulfolenes, such as 3-sulfolene, to sulfolanes.

Sulfolanes are compounds useful for a variety of purposes, such as in pesticidal compositions, intermediates in the production of other organic chemicals, as selective solvents for various hydrocarbons, fatty acids or fatty acid esters and the like.

These sulfolane compounds are generally prepared by the catalytic hydrogenation of monomeric cyclic sulfolenes, such as 3-sulfolene (2,3,4,5-tetrahydrothiophene-1,1-dioxide). These sulfolene compounds are unstable and decompose into an unsaturated organic compound and sulfur dioxide. For instance, 3-sulfolene decomposes rapidly into butadiene and sulfur dioxide at temperatures in the neighborhood of 120 to 120° C. These sulfolene compounds also decompose at the relatively low temperatures of storage and handling. Further, when these sulfolenes are used to prepare the corresponding sulfolanes by hydrogenation, the initiation of the reaction may increase the temperature enough to result in some decomposition. The sulfolenes themselves are usually prepared by the known reaction of sulfur dioxide with an unsaturated organic compound containing two or more ethylenic linkages, particularly those containing at least two such linkages in conjugated position, e.g., 1,3-butadiene, isoprene, piperylene. Even though extreme care is exercised in recovering the sulfolene product to remove as much of the excess sulfur dioxide as possible, some residual sulfur dioxide may be contained in the sulfolene product. Thus, for one or more of these reasons sulfur dioxide is commonly associated with sulfolenes.

Because sulfur dioxide is commonly associated with sulfolene feed stocks, the catalytic hydrogenation of such feed stocks to produce the corresponding sulfolanes is adversely affected by the presence of the sulfur dioxide impurity, such sulfur dioxide having a deleterious effect on the reaction rate and conversion.

Accordingly, an object of this invention is to provide an improved method for the catalytic hydrogenation of sulfolenes to sulfolanes, notwithstanding the presence of sulfur dioxide in the sulfolene feed. Other objects and advantages of this invention will become apparent to those skilled in the art from the following discussion and appended claims.

Broadly, this invention resides in a process for improving the catalytic hydrogenation of sulfolenes to sulfolanes by carrying the reaction out after first adding hydrogen peroxide to the sulfolene feed. The use of the hydrogen peroxide overcomes the problems attending the use of sulfolene feed stocks containing sulfur dioxide impurity. Further, the use of hydrogen peroxide in the hydrogenation reaction reduces the amount of catalyst required, eliminates costly recrystallization steps for purifying the sulfolene feed stock to remove the sulfur dioxide impurity, permits the utilization of impure or off-specification sulfolene, increases the reaction rate and thereby reduces the time required for hydrogenation, and improves the conversion of the sulfolene feed stock.

The term "a sulfolene compound" as used in the specification and in the appended claims defines generically unsubstituted and substituted unsaturated compounds comprising or containing a sulfolene nucleus, i.e., a five-membered ring of four carbon atoms and one sulfur atom with two oxygen atoms each directly attached to the sulfur atom. Such a sulfolene nucleus can have various organic and/or inorganic and particularly hydrocarbon radicals attached as substituents to the nuclear carbon atoms. Such radicals include alkyl, alkenyl, aryl, aralkyl, alkaryl, alicyclic and/or heterocyclic radicals, substituted for one or more of the hydrogen atoms of the above unsubstituted sulfolenes. A preferred class of these sulfolene compounds comprises those which contain an olefinic linkage in the 3-position, such as 3-sulfolene. A particularly suitable subclass of compounds which may be employed as the starting materials comprise sulfolenes having either of the general formulas:

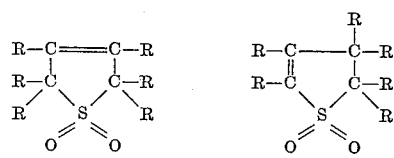

wherein each of said R represents a hydrogen atom or a hydrocarbon radical, particularly an aliphatic radical which may be saturated or unsaturated. Representative sulfolene compounds which can be used in this invention include 2-sulfolene, 3-sulfolene, 3-methyl-2-sulfolene, 2-methyl-3-sulfolene, 3-methyl-3-sulfolene, 2,4-dimethyl-2-sulfolene, 2,4-dimethyl-3-sulfonene, 3-ethyl-3-sulfolene, and their homologues, as well as other sulfolene compounds in which hydrocarbon radicals, such as methyl, ethyl, vinyl, propyl, isopropyl, propenyl, allyl, isopropenyl, butyl, isobutyl, butenyl, isobutenyl, pentenyl, amyl, hexyl, isohexyl, isohexenyl, cyclobutyl, cyclopentyl, cyclopentenyl, phenyl, benzyl, xylyl, and other like radicals substituted for one or more of the hydrogen atoms of the unsubstituted sulfolene compounds. Also, other derivatives of these sulfolene compounds, e.g., those in which inorganic radicals or groups such as a halogen atom, a hydroxyl group, or the like, are substituted for one or more of the hydrogen atoms of the nuclear and/or side-chain carbon atoms, may be employed as the starting materials.

The term "a sulfolane compound" as used in this specification and in the appended claims refers to an unsubstituted or substituted saturated sulfolene compound. In other words, the sulfolane compound contains or consists of a saturated five-membered ring of four carbon atoms and a sulfur atom, the latter having two oxygen atoms directly attached thereto. A sulfolene compound having an unsaturated aliphatic side chain and a nucleus unsaturated will under the catalytic hydrogenation conditions of this invention be preferentially hydrogenated at the double bond in the ring so that the hydrogenation product consists of or at least predominates in containing an unsaturated aliphatic side chain.

The amount of sulfur dioxide impurity present in the solfolene feed will vary and depend upon such factors as the efficiency of the recovery and purification of the sulfolene feed stock, the age of the sulfolene feed stock and temperature during its storage and handling as well as hydrogenation reaction temperatures, etc. Generally the amount of sulfur dioxide will vary from about 0.005 to about 0.5 weight percent of the sulfolene feed stock, or higher.

The hydrogen peroxide which is used according to this invention to reduce or eliminate the deleterious effect of the sulfur dioxide on the hydrogenation reaction can vary and will be primarily dependent upon the sulfur dioxide content of the sulfolene feed stock. Functionally speaking, the amount of hydrogen peroxide used in this invention will be that sufficient to oxidize the sulfur dioxide impurity to sulfur trioxide, an excess of hydrogen peroxide being preferred for this purpose. For sulfur dioxide contents ranging from 0.005 to 0.5 weight percent of the sulfolene feed stock, the amount of hydrogen peroxide (100 percent $H_2O_2$ basis) will be in the range of at least 0.003 and 0.265 weight percent. I prefer to use aqueous hydrogen peroxide, with the $H_2O_2$ concentration ranging from 1 to 50 weight percent. And I prefer to mix the aqueous hydrogen peroxide with the sulfur dioxide-containing sulfolene feed stock prior to contacting the same with the hydrogenation catalyst.

The catalytic hydrogenation is preferably carried out with the sulfolene compound in the liquid state, for example by maintaining it above its melting point (but below its thermal decomposition) or in solution in a suitable solvent such as water, benzene, dioxane, alcohols such as methyl, ethyl, isopropyl or tertiary butyl alcohol, the sulfolane compound itself, and the like. The amount of solvent used can vary, and generally will be in the range of about 5 to 50 weight percent, preferably 15 to 30 weight percent. I prefer to use about a 33 weight percent slurry of sulfolene in water, since sulfolane is miscible with water. The use of a solvent permits better control over the temperature of the rapid and exothermic hydrogenation reaction.

Catalysts which can be used in this invention include any of those known in the art useful in the catalytic hydrogenation of sulfolenes to sulfolanes. A preferred class of hydrogenation catalysts are those which comprise the base metal hydrogenation catalysts, such as those containing or consisting of nickel, cobalt, copper, platinum, palladium or mixtures of these metals with themselves or with other metals such as iron, zinc, chromium, cadmium, etc. These metals may be used in finely divided form such as, for example, Raney nickel, or may be suitably supported on a support such as kieselguhr, aluminum oxide, diatomaceous earth, and the like. These catalysts can be prepared in any suitable manner, and a discussion of such preparation will be omitted in the interest of brevity.

The reaction temperatures and pressures can vary and be carried out over wide ranges. In fact any temperature is operable at which the reaction mixture is liquid, and which is below that at which the materials decompose. In order to avoid any substantial thermal decomposition, I prefer to operate below 50° C., preferably in the range from 10 to 40° C. Hydrogenation proceeds at hydrogen pressures above 5 pounds per square inch gauge and is effected quite rapidly and smoothly at 500 and 1500 pounds per square inch gauge. Pressures above this range can be employed if desired.

Following completion of the hydrogenation reaction, the sulfolane product can be recovered by conventional procedures. Generally this comprises first cooling the reaction mixture, venting gases therefrom, filtering the cooled reaction mixture to remove catalyst, and fractionating the filtered reaction mixture to remove solvent and unreacted sulfolene.

To illustrate the objects and advantages of this invention, the following examples are set forth hereinbelow. However, it should be understood that this invention is not to be limited unduly to any of the conditions of reaction, amounts, etc., set forth in these examples.

EXAMPLE I

In this example, three runs were carried out in which 3-sulfolene was catalytically hydrogenated to produce sulfolane. In one of these runs, the reaction was carried out in the presence of hydrogen peroxide according to this invention, and in the other two runs the reaction was carried out in the absence of hydrogen peroxide for comparison purposes.

The hydrogenation runs were carried out in a stainless steel stirred jacketed vessel with an eduction tube, using Raney nickel catalyst. This catalyst was prepared by adding powdered nickel-aluminum alloy to an excess of aqueous sodium hydroxide. The aluminum in the alloy was converted to a sodium aluminate with evolution of hydrogen. The porous or "spongy" high-surface nickel remaining was washed with water and kept under water to retain its activity. In each run, 100 grams of the sulfolenes was added to 200 grams of water in the vessel. When used, the hydrogen peroxide was added as a 5 percent aqueous solution at this time. After addition of the catalyst, the stirred reactor was pressured to 300 p.s.i.g. with hydrogen while circulating tap water through the jacket to maintain a reaction temperature of 21–22° C. Samples were periodically withdrawn from the eduction tube and the sulfolene contents thereof determined. Data for these runs are set forth in Table I.

*Table I*

| | Run 1 | Run 2 | Run 3 |
|---|---|---|---|
| Amount of $SO_2$ in sulfolene, wt. percent | 0.3 | 0.3 | 0.3 |
| Amount of $H_2O_2$ used, wt. percent of sulfolene | 0 | 0 | 0.16 |
| Amount of catalyst used, wt. percent of sulfolene | 2.3 | 5.2 | 2.7 |
| Amount of sulfolene in solvent, wt. percent reaction time, hrs.: | | | |
| 0 | 33.3 | 33.3 | 33.3 |
| 1.6 | | | 18.7 |
| 2.6 | | | 11.9 |
| 3.0 | 21.8 | | |
| 3.6 | | | 6.2 |
| 4.0 | | 17.4 | |
| 4.6 | | | 2.8 |
| 6.0 | 15.2 | 9.8 | |
| 6.6 | | | 1.0 |
| Conversion of sulfolene to sulfolene, percent | 54.4 | 70.6 | 97.0 |

Examination of Table I shows that the reaction in run No. 3, where hydrogen peroxide was used according to this invention, was materially faster than that of control runs 1 and 2.

EXAMPLE II

In this example, two batches of sulfolane were prepared in a pilot plant by the catalytic hydrogenation of 3-sulfolene in the presence of hydrogen peroxide according to the practice of this invention.

The 3-sulfolene feed used in these batch hydrogenations was prepared by the reaction of 1,3-butadiene and sulfur dioxide. In preparing each batch, a solution of 27–30 wt. percent of 3-sulfolene in water was prepared and charged to a 300-gallon reactor. The sulfur dioxide content of the solution was determined (0.10 wt. percent in batch 1 and 0.05 wt. percent in batch 2), and an equivalent amount of hydrogen peroxide was added. A 2.6 wt. percent charge of activated Raney nickel (based on the sulfolene) was added to the reactor. This catalyst was prepared by treating it with an equivalent amount of 76% sodium hydroxide solution, after which it was washed with water to remove excess sodium hydroxide. The reactor was pressured to 300 p.s.i.g. with hydrogen. Table II sets forth the reaction charges for both batch operations.

*Table II*

| | Batch 1 | Batch 2 | Total |
|---|---|---|---|
| Sulfolene, lbs | 500 | 489 | 989 |
| Raney nickel, lbs | 26 | 26 | 52 |
| Hydrogen, cyl | 14 | 10 | 24 |
| Sodium hydroxide (76%) lbs | 26 | 26 | 52 |
| Hydrogen peroxide (35%) lbs | 0.78 | 0.43 | 1.21 |

The heat of reaction was removed by circulating cooling water in the jacket of the reactor. After the hydrogenation step was completed, the reactor effluent was filtered to remove the nickel catalyst. A total of 300 gallons (3,344 pounds) of reactor effluent was recovered from the two batch preparations having the following composition:

*Table III*

|  | Pounds | Percent |
|---|---|---|
| Sulfolene | 57 | 1.7 |
| Sulfolane | 873 | 26.1 |
| Water | 2,414 | 72.2 |
|  | 3,344 | 100.0 |

The first batch operation resulted in 95% conversion and the second batch operation of 93% conversion, giving an average conversion of 3-sulfolene to sulfolane of 94%.

Various modifications and alterations of this invention wil become apparent to those skilled in the art from the foregoing discussion, and it should be understood that this invention is not to be limited unduly to that set forth herein for illustrative purposes.

I claim:

1. In a process for producing a sulfolane compound, wherein feed comprising a sulfolene compound is catalytically hydrogenated in the presence of a hydrogenation catalyst, the improvement comprising carrying out said hydrogenation step after first adding hydrogen peroxide to said feed.

2. In a process for producing a sulfolane compound, wherein feed comprising a sulfolene compound is catalytically hydrogenated in the presence of a hydrogenation catalyst, the improvement comprising carrying out said hydrogenation step after first adding hydrogen peroxide to said feed in an amount sufficient to oxidize sulfur dioxide present in said feed.

3. In a process for producing sulfolane, wherein feed comprising 3-sulfolene and sulfur dioxide is subjected to catalytic hydrogenation conditions and contacted with an active nickel hydrogenation catalyst, the improvement comprising carrying out said hydrogenation step after first adding aqueous hydrogen peroxide to said feed, the amount of hydrogen peroxide used (100 percent hydrogen peroxide basis) being sufficient to oxidize said sulfur dioxide.

References Cited in the file of this patent

UNITED STATES PATENTS

| 2,451,298 | Morris et al. | Oct. 12, 1948 |
| 2,578,565 | Mahan et al. | Dec. 11, 1951 |

OTHER REFERENCES

Maxted et al.: Jour. Chem. Soc., 1953, pages 1509–11.
Maxted et al.: Jour. Chem. Soc., 1945, pages 763–6.
Chemical Abstracts, vol. 46, pages 6289–90 (1952), abstracting Armed Forces Chem. Jour., vol. 5, No. 4, pages 556–66.